US008859126B2

(12) United States Patent
Yamada

(10) Patent No.: US 8,859,126 B2
(45) Date of Patent: Oct. 14, 2014

(54) VEHICULAR BATTERY UNIT

(75) Inventor: Kentaro Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 13/284,980

(22) Filed: Oct. 31, 2011

(65) Prior Publication Data

US 2012/0121959 A1 May 17, 2012

(30) Foreign Application Priority Data

Nov. 16, 2010 (JP) ................................ 2010-255880

(51) Int. Cl.
*H01M 2/10* (2006.01)
*H01M 10/6561* (2014.01)
*H01M 10/6556* (2014.01)
*H01M 10/625* (2014.01)
*H01M 10/66* (2014.01)
*H01M 10/613* (2014.01)
*B60K 1/04* (2006.01)
*B60K 1/00* (2006.01)

(52) U.S. Cl.
CPC ........ *H01M 2/1083* (2013.01); *H01M 10/5063* (2013.01); *B60K 2001/0438* (2013.01); *Y02E 60/12* (2013.01); *B60K 1/04* (2013.01); *B60K 2001/005* (2013.01); *H01M 10/5057* (2013.01); *H01M 10/5016* (2013.01); *H01M 10/5093* (2013.01); *H01M 10/5004* (2013.01)
USPC ............................ 429/100; 429/149; 429/153

(58) Field of Classification Search
USPC ......................................... 429/100, 149, 153
See application file for complete search history.

(56) References Cited

U.S. PATENT DOCUMENTS 5,392,873 A * 2/1995 Masuyama et al. .......... 180/68.5

FOREIGN PATENT DOCUMENTS

| JP | 08-244473 | 9/1996 |
| JP | 2005-228634 | 8/2005 |
| JP | 2007-331719 | 12/2007 |

OTHER PUBLICATIONS

Japanese Office Action for corresponding JP Application No. 2010-255880, Feb. 5, 2014.
Chinese Office Action for corresponding CN Application No. 201110316988.9, Nov. 29, 2013.

* cited by examiner

*Primary Examiner* — Jane Rhee
(74) *Attorney, Agent, or Firm* — Mori & Ward, LLP

(57) ABSTRACT

A vehicular battery unit includes a battery unit body, a hollow frame, and a drain pipe. The battery unit body includes a first floor face to support a first battery. The hollow frame is disposed along the first floor face of the battery unit body to reinforce the battery unit body and has a first drain hole connecting the first floor face of the battery unit body to an interior of the hollow frame. The drain pipe extends downward from the interior of the hollow frame through a bottom wall of the hollow frame.

12 Claims, 13 Drawing Sheets

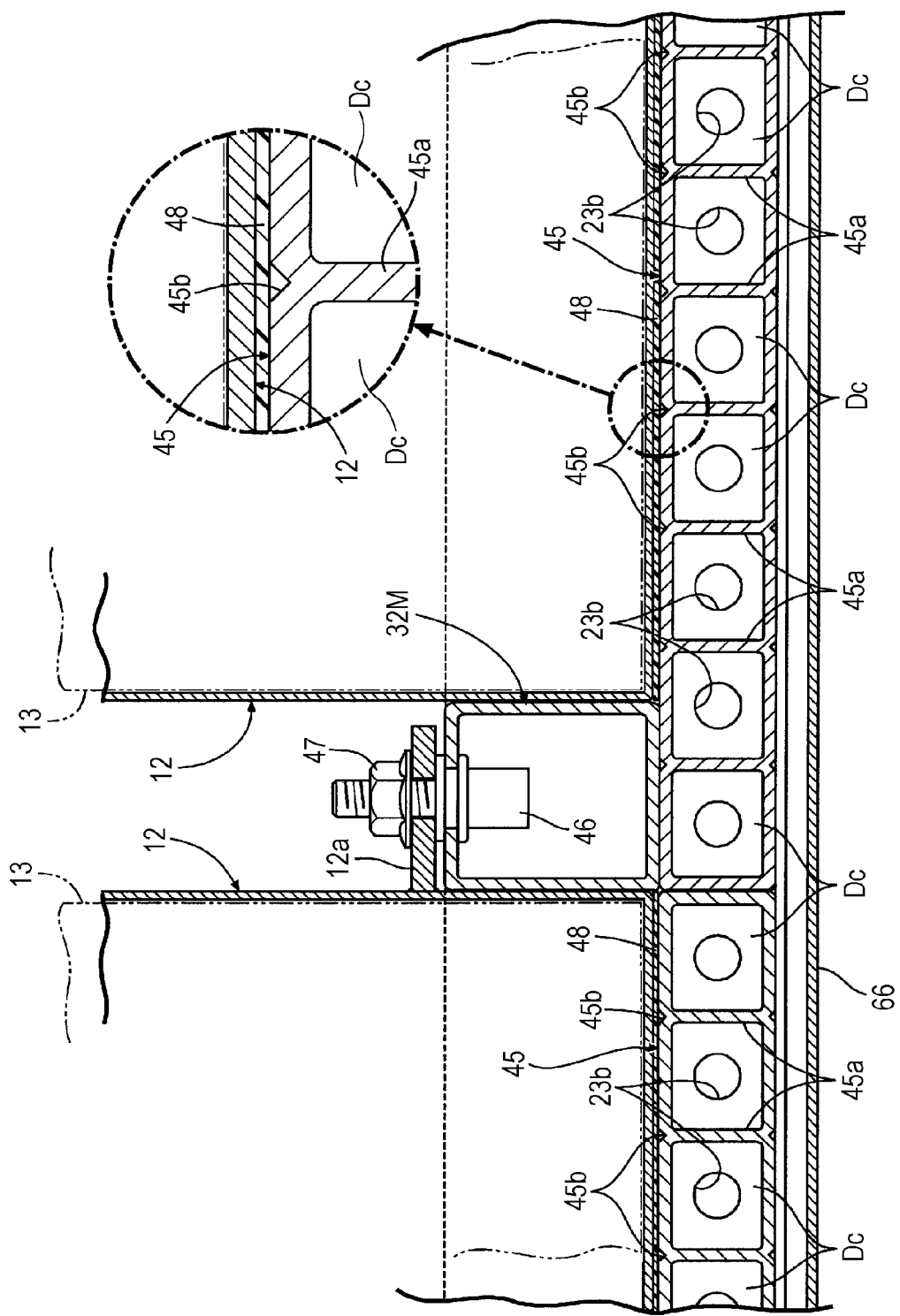

US 8,859,126 B2

VEHICULAR BATTERY UNIT

CROSS-REFERENCE TO RELATED APPLICATIONS

The present invention claims priority under 35 U.S.C. §119 to Japanese Patent Application No. 2010-255880, filed Nov. 16, 2010, entitled "Vehicular Battery Unit." The contents of this application are incorporated herein by reference in their entirety.

BACKGROUND OF THE INVENTION

1. Field of the Invention

The present invention relates to a vehicular battery unit.

2. Discussion of the Background

Japanese Unexamined Patent Application Publication No. 2007-331719 discloses a structure where a battery is supported above the bottom surface of a recess for accommodating the battery when the battery is placed in the recess, thereby preventing the battery from being immersed in water, and a check valve which permits only drainage outside a vehicle from the recess side is provided at a drain outlet provided in the bottom wall of the recess.

SUMMARY OF THE INVENTION

According to one aspect of the present invention, a vehicular battery unit comprises a battery unit body, a hollow frame, and a drain pipe. The battery unit body includes a first floor face to support a first battery. The hollow frame is disposed along the first floor face of the battery unit body to reinforce the battery unit body and has a first drain hole connecting the first floor face of the battery unit body to an interior of the hollow frame. The drain pipe extends downward from the interior of the hollow frame through a bottom wall of the hollow frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a cross-sectional view along line V-V in FIG. 3.

DESCRIPTION OF THE EMBODIMENTS

Figure 1:
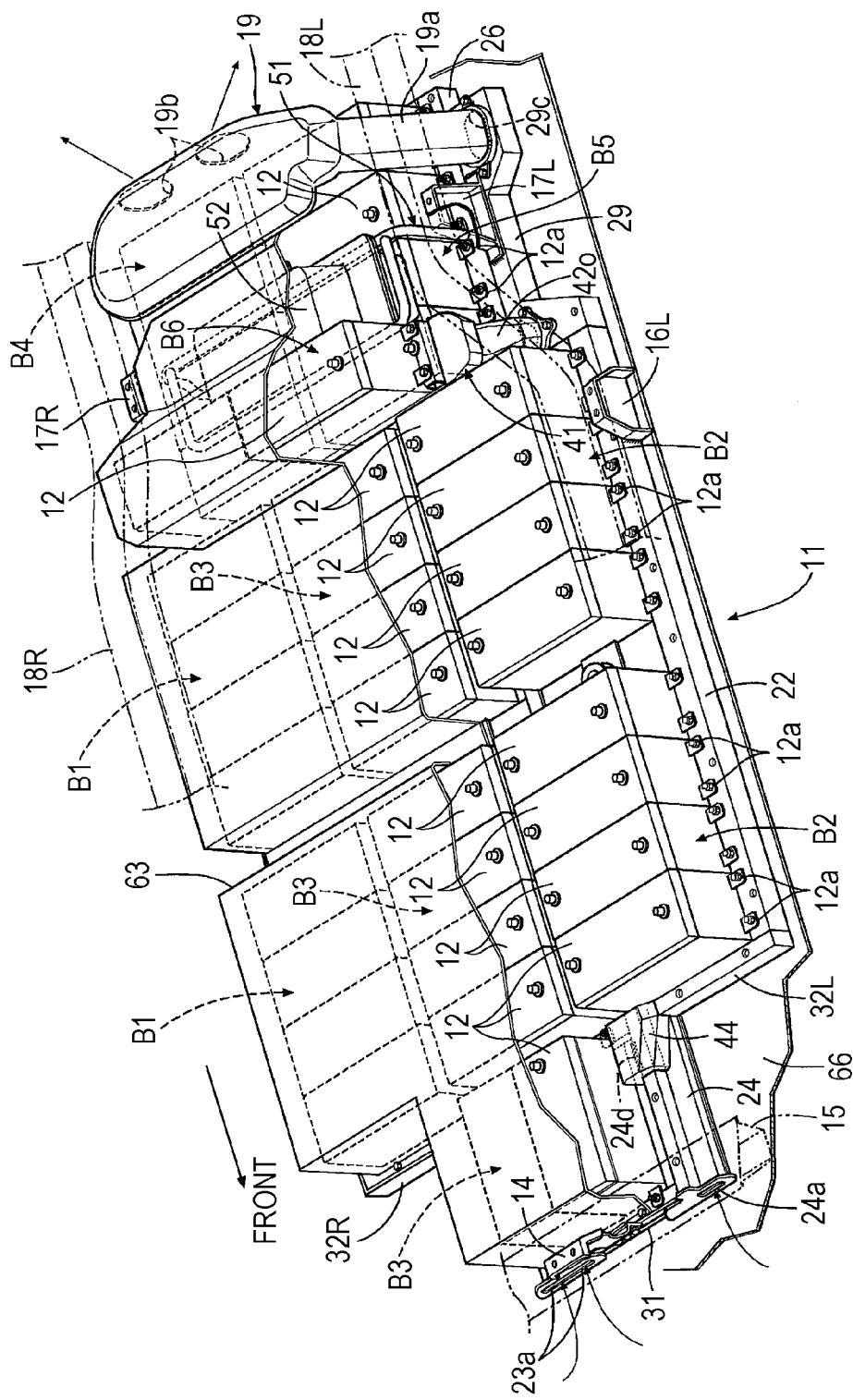
FIG. 1 is a perspective view of the battery unit of an electronic vehicle.

The embodiments will now be described with reference to the accompanying drawings, wherein like reference numerals designate corresponding or identical elements throughout the various drawings.

An embodiment of the present invention will be described below with reference to FIGS. 1 to 13B.

Figure 2:
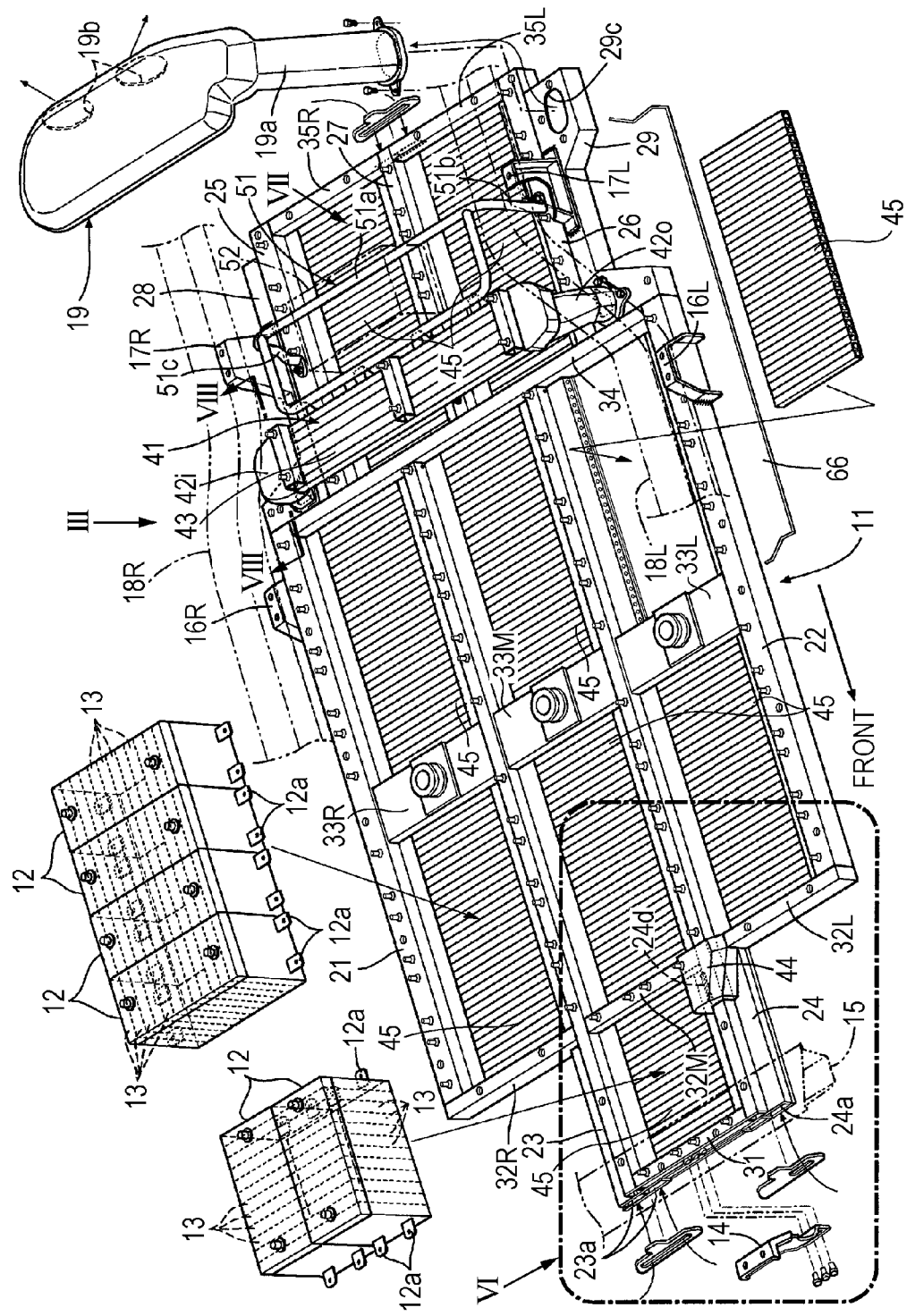
FIG. 2 is a diagram showing battery modules removed from the battery unit in FIG. 1.
Figure 3:
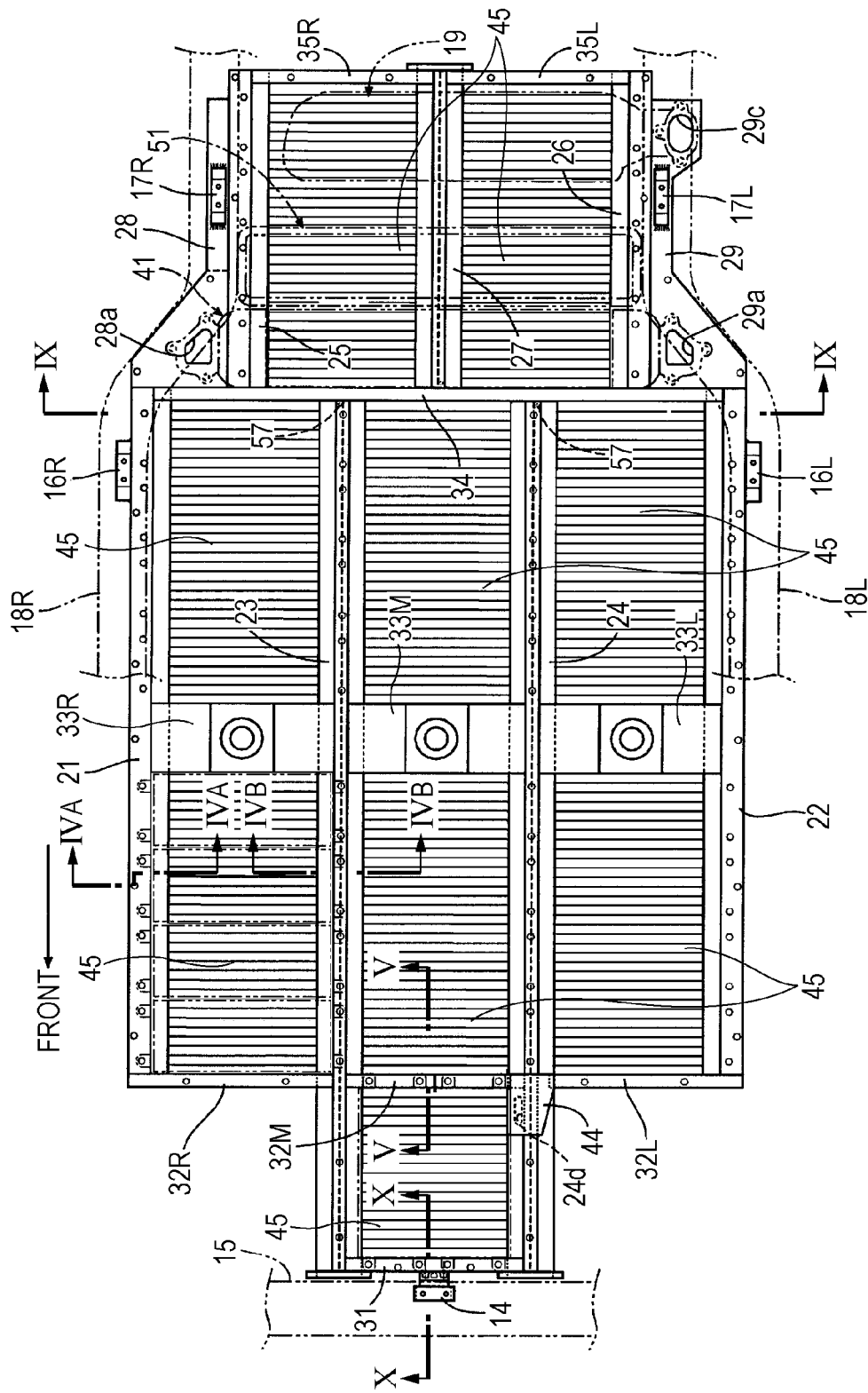
FIG. 3 is a diagram showing the battery unit in FIG. 2 from three directions.

As shown in FIGS. 1 to 3, a battery unit which supplies power to a motor generator or a power source for an electronic vehicle includes a flat-shaped tray 11 and a plurality of battery modules 12 mount on the floor face of the tray 11. Each battery module 12 has a rectangular parallelepiped shape and accommodates a plurality of battery cells 13 (see FIG. 2) inside electrically connected in series. Two brackets 12a, 12a are protrusively provided on both lengthwise end faces of the battery module 12 to fix the battery module 12 to the tray 11.

A mounting bracket 14 provided on a front portion of the tray 11 is coupled to a cross member 15 of the vehicle body, two mounting brackets 16L, 17L provided on a left-hand portion of the tray 11 are coupled to a left side frame 18L, and two mounting brackets 16R, 17R provided on a right-hand portion of the tray 11 are coupled to a right side frame 18R, thus supporting the battery unit suspended on the vehicle body. A fan unit 19 accommodating an electric fan (not shown) is provided on a rear end of the tray 11. When outside air sucked by the fan unit 19 flows inside the tray 11, the outside air exchanges heat with the battery modules 12 mounted on the floor face of the tray 11 to cool the battery modules 12.

The tray 11 includes a first vertical frame member 21, a second vertical frame member 22, a third vertical frame member 23 and a fourth vertical frame member 24 which extend in parallel along the vehicle body. The first vertical frame member 21 is disposed on the right side in the widthwise direction of the vehicle, the second vertical frame member 22 is disposed on the left side in the widthwise direction of the vehicle, the third vertical frame member 23 is disposed inward of the first vertical frame member 21 in the widthwise direction of the vehicle, and the fourth vertical frame member 24 is disposed inward of the second vertical frame member 22 in the widthwise direction of the vehicle.

The tray 11 includes, at the back of the first to fourth vertical frame members 21 to 24, a fifth vertical frame member 25, a sixth vertical frame member 26 and a seventh vertical frame member 27 which extend in parallel along the front-to-rear direction of the vehicle body. The fifth vertical frame member 25 is disposed on the right side in the widthwise direction of the vehicle, the sixth vertical frame member 26 is disposed on the left side in the widthwise direction of the vehicle, and the seventh vertical frame member 27 is disposed in the center of the vehicle body. An eighth vertical frame member 28 is connected in parallel to the outside of the fifth vertical frame member 25 in the widthwise direction of the vehicle, and a ninth vertical frame member 29 is connected in parallel to the outside of the seventh vertical frame member 27 in the widthwise direction of the vehicle.

A first horizontal frame member 31 extending in the widthwise direction of the vehicle is connected between the front ends of the third and fourth vertical frame members 23, 24. Three separated second horizontal frame members 32L, 32M, 32R extending in the widthwise direction of the vehicle are connected between the front ends of the first and second vertical frame members 21, 22. The fourth vertical frame member 24 is held between the left and center second horizontal frame members 32L, 32M, and the third vertical frame member 23 is held between the center and right second horizontal frame members 32M, 32R. Three separated third horizontal frame members 33L, 33M, 33R extending in the widthwise direction of the vehicle are connected between the first and second vertical frame members 21, 22. The fourth vertical frame member 24 is held between the intermediate portions of the left and center second horizontal frame members 32L, 32M in the front-to-rear direction, and the third vertical frame member 23 is held between the center and right third horizontal frame members 33M, 33R.

A fourth horizontal frame member 34 extending in the widthwise direction of the vehicle is connected to the rear ends of the first to fourth vertical frame members 21 to 24. The front ends of the fifth to seventh vertical frame members 25 to 27 are connected to the fourth horizontal frame member 34, and two separated fifth horizontal frame members 35L, 35R extending in the widthwise direction of the vehicle are connected to the rear ends of the fifth to seventh vertical frame members 25 to 27.

An inlet-side leg 42$i$ and an outlet-side leg 42$o$ are provided upright on the front ends of the eighth vertical frame member 28 and the ninth vertical frame member 29 respectively. A rectangular flat-shaped heat exchange panel 43 extending in the widthwise direction of the vehicle is provided bridging between the upper ends of the inlet-side leg 42$i$ and the outlet-side leg 42$o$.

The mounting bracket 14 is fixed to the front side of the first horizontal frame member 31. The mounting brackets 16L, 17L are fixed to the outer surfaces of the first and second vertical frame members 21, 22, respectively. The mounting brackets 17L, 17R are fixed to the top surfaces of the eighth and ninth vertical frame members 28, 29, respectively.

An inlet duct 19$a$ of the fan unit 19 is fixed to an opening 29$c$ formed in the rear top surface of the ninth vertical frame member 29. Two drain outlets 19$b$, 19$b$ of the fan unit 19 are open rearward on the right and left side of the vehicle body.

Next, the flow passage of air as a coolant which flows inside the tray 11 will be described. The general structure of the air flow passage is exemplarily shown in FIG. 12.

Figure 4A:
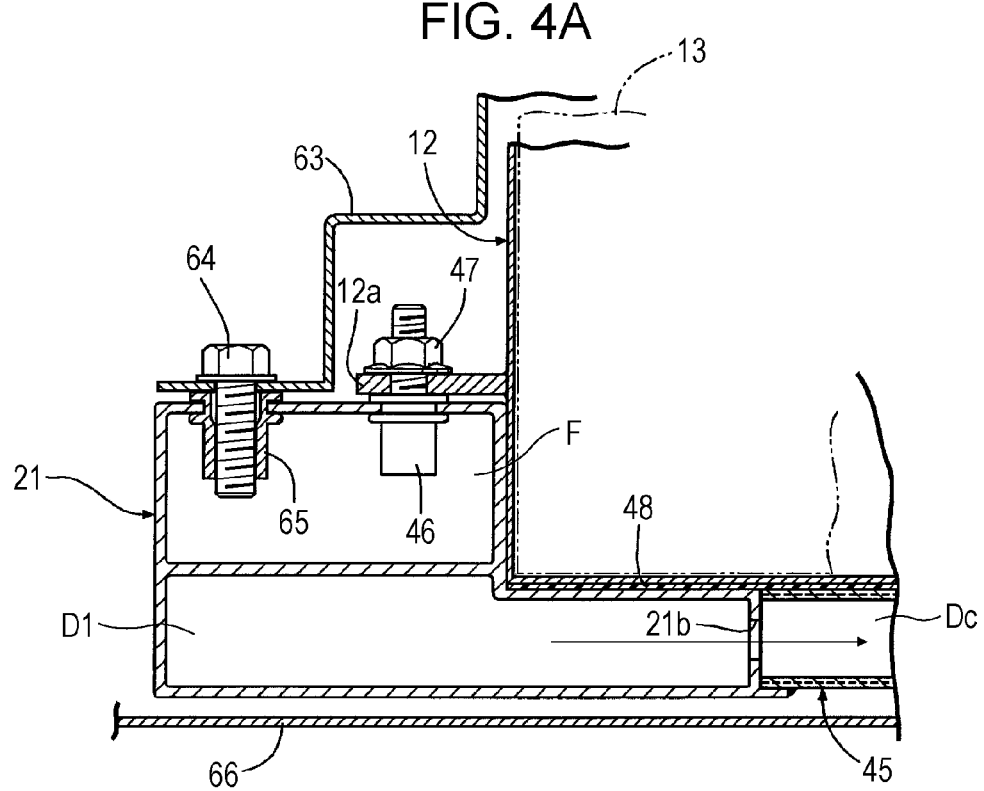
FIG. 4A is a cross-sectional view along line IVA-IVA in FIG. 3.
Figure 12:
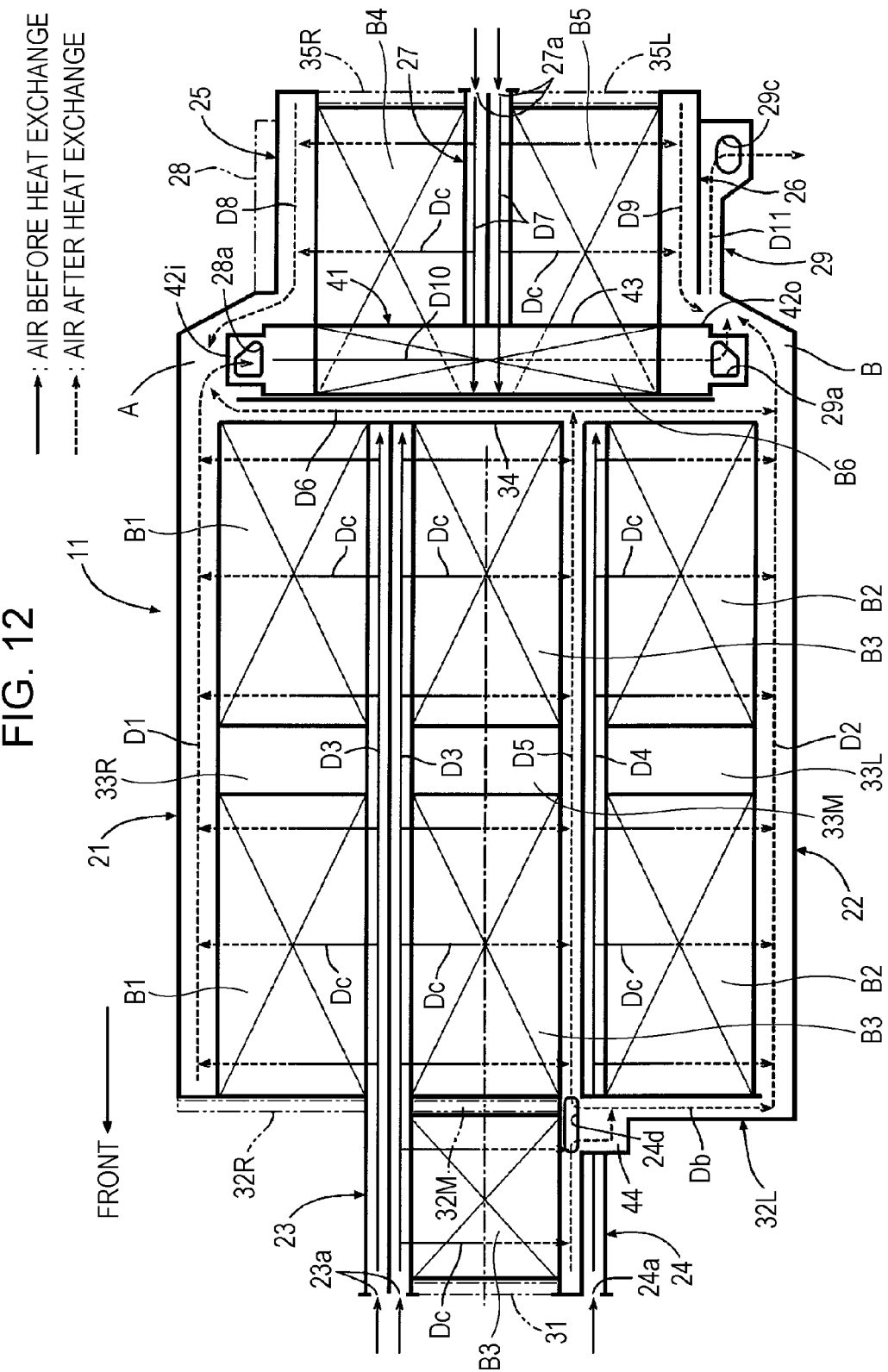
FIG. 12 is an exemplary diagram for explaining the flow passage of cooling air.

As shown in FIGS. 3 and 12, the first vertical frame member 21, the second vertical frame member 22, the fifth vertical frame member 25 and the sixth vertical frame member 26 are all formed by extruded members having the same cross-sectional shape. As shown in FIG. 4A, the first vertical frame member 21 has an L-shaped cross section, and has an upper hollow frame F and a lower first duct D1 formed integrally. The second vertical frame member 22, the fifth vertical frame member 25 and the sixth vertical frame member 26 which have the same cross section to that of the first vertical frame member 21 respectively have a second duct D2, an eighth duct D8 and a ninth duct D9 under their hollow frames F. An eleventh duct D11 is formed inside the ninth vertical frame member 29.

Figure 4B:
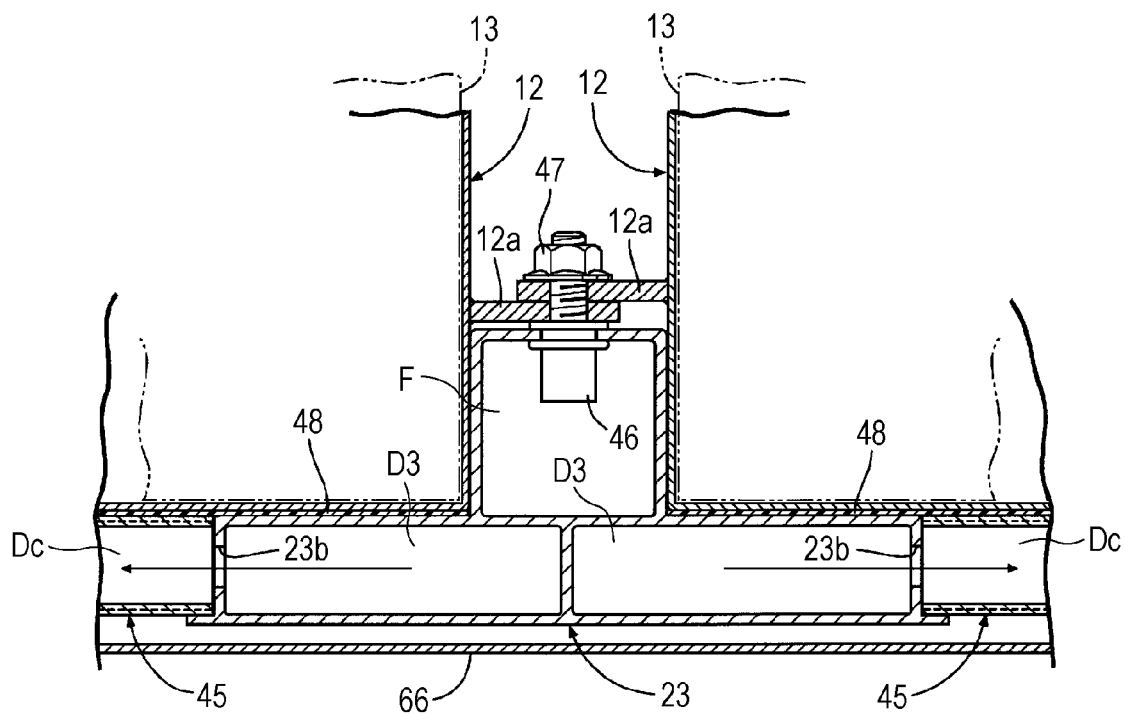
FIG. 4B is a cross-sectional view along line IVB-IVB in FIG. 3.

As shown in FIGS. 3 and 12, the third vertical frame member 23, the fourth vertical frame member 24 and the seventh vertical frame member 27 are all formed by extruded members having the same cross-sectional shape. As shown in FIG. 4B, the third vertical frame member 23 has a cross section with a projectional shape, and has an upper hollow frame F and a pair of third ducts D3, D3 provided consecutively in the widthwise direction of the vehicle under the hollow frame F. The fourth vertical frame member 24 which has the same cross section to that of the third vertical frame member 23 has a fourth duct D4 on the left-hand side in the widthwise direction of the vehicle and a fifth duct D5 on the right-hand side in the widthwise direction of the vehicle under the hollow frame F. The seventh vertical frame member 27 which has the same cross section to that of the fourth vertical frame member 24 has a pair of right and left seventh ducts D7, D7 provided integrally under the hollow frame F.

As shown in FIGS. 3, 5 and 12, the first horizontal frame member 31, the second horizontal frame members 32L, 32M, 32R, the fourth horizontal frame member 34 and the fifth horizontal frame members 35L, 35R are all formed by extruded members having the same square cross-sectional shape. The second horizontal frame member 32L on the left-hand side constitutes a bypass duct Db (see FIG. 6) which has a left end connected to the front end of the second duct D2, and a right end connected to an opening 24$d$ (see FIG. 6) in the top surface of the fifth duct D5 via a flow-passage forming member 44 covering the top surface of the fourth vertical frame member 24.

A heat insulator such as a foam may be provided between the flow-passage forming member 44 and the fourth duct D4. The heat insulator may be provided with recesses and projections which have a rectifying capability and extend toward the bypass duct Db from the opening 24$d$ in the top surface of the fifth duct D5. This can prevent heat exchange between low-temperature air flowing through the fourth duct D4 and high-temperature air discharged into the bypass duct Db.

The interior of the fourth horizontal frame member 34 constitutes a sixth duct D6 to which the rear ends of the first and second ducts D1, D2, the rear end of the fifth duct D5, the front ends of the eighth and ninth ducts D8, D9, and the front end of the eleventh duct D11 are connected. It is to be noted that the center second horizontal frame member 32M, the right second horizontal frame member 32R, the third horizontal frame members 33L, 33M, 33R, and the fifth horizontal frame members 35L, 35R do not serve as air flow passages.

The rear end of the first duct D1, the rear end of the eighth duct D8 and the right end of the sixth duct D6 are merged at a first merge portion A (see FIG. 12) at the front portion of the eighth vertical frame member 28, and the rear end of the second duct D2, the front end of the ninth duct D9, the front end of the eleventh duct D11 and the left end of the sixth duct D6 are merged at a second merge portion B (see FIG. 12) at the front portion of the ninth vertical frame member 29. As shown in FIGS. 2 and 3, the inlet-side leg 42$i$ of a battery-module support 41 is connected to an opening 29$a$ above the first merge portion A, and the outlet-side leg 42$o$ of the battery-module support 41 is connected to an opening 28$a$ above the second merge portion B. The rectangular flat-shaped heat exchange panel 43 extending in the widthwise direction of the vehicle is provided bridging between the upper ends of the inlet-side leg 42$i$ and the outlet-side leg 42$o$, and tenth ducts D10 are formed inside the heat exchange panel 43.

Suction ports 23$a$, 23$a$ are formed in the front ends of the pair of third ducts D3, D3 of the third vertical frame member 23. A suction port 24$a$ is formed in the fourth duct D4 of the fourth vertical frame member 24. Suction ports 27$a$, 27$a$ are formed in the rear ends of the pair of seventh ducts D7, D7 of the seventh vertical frame member 27.

The third vertical frame member 23 and the first vertical frame member 21 are connected together by two heat exchange panels 45, 45. The fourth vertical frame member 24 and the second vertical frame member 22 are connected together by two heat exchange panels 45, 45. The third vertical frame member 23 and the fourth vertical frame member 24 are connected together by three heat exchange panels 45. The seventh vertical frame member 27 and the fifth vertical frame member 25 are connected together by a heat exchange panel 45. The seventh vertical frame member 27 and the sixth vertical frame member 26 are connected together by a heat exchange panel 45.

As shown in FIG. 5, multiple connection ducts Dc are formed inside each heat exchange panel 45 by multiple partitions 45a extending in the air-flowing direction. Multiple connection holes 21b to 27b are formed on side surfaces of the first to seventh vertical frame members 21 to 27, so that the internal spaces of the first to seventh vertical frame members 21 to 27 communicate with the internal spaces of the connection ducts Dc via the connection holes 21b to 27b.

As shown in FIGS. 1, 4A and 4B, two or four battery modules 12 are supported on the top surface of each heat exchange panel 45, and four brackets 12a of each battery module 12 are fixed to the first to seventh vertical frame members 21 to 27 and the first horizontal frame member 31 and the second horizontal frame member 32M by bolts 46 and nuts 47. At the time of the fixture, as shown in FIGS. 4A, 4B and 5, a silicon sheet 48 having high heat conductivity is held between the bottom surfaces of the battery modules 12 and the top surface of the heat exchange panel 45, and multiple air drain grooves 45b extending in parallel are formed in the top surface of the heat exchange panel 45.

As shown in FIGS. 1 and 12, eight battery modules 12 arranged between the first and third vertical frame members 21, 23 constitute a first battery group B1, eight battery modules 12 arranged between the second and fourth vertical frame members 22, 24 constitute a second battery group B2, ten battery modules 12 arranged between the third and fourth vertical frame members 23, 24 constitute a third battery group B3, three battery modules 12 arranged between the fifth and seventh vertical frame members 25, 27 constitute a fourth battery group B4, three battery modules 12 arranged between the sixth and seventh vertical frame members 26, 27 constitute a fifth battery group B5, and two battery modules 12 placed on the battery-module support 41 constitute a sixth battery group B6.

Figure 7:
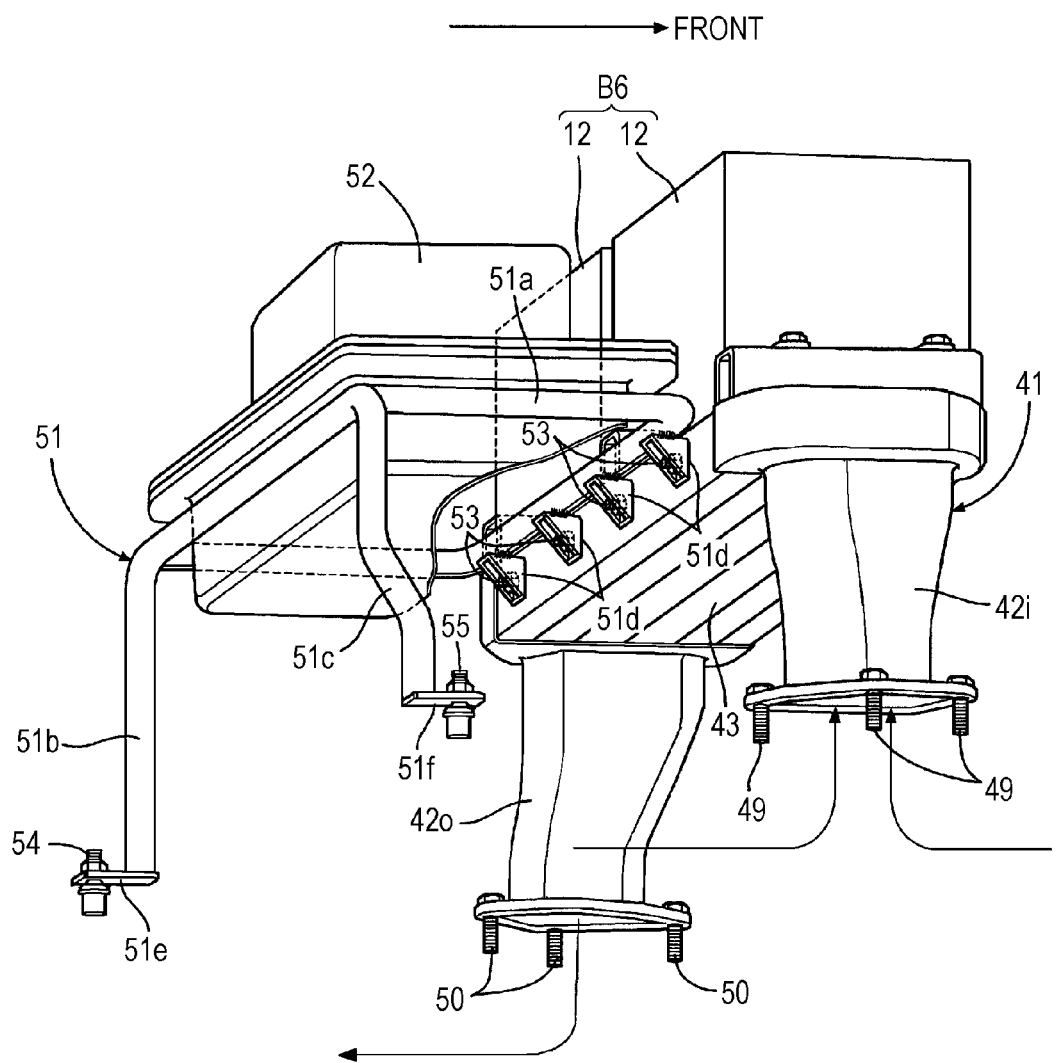
FIG. 7 is a perspective view showing a communication unit of the battery unit of an electronic vehicle.
Figure 8:
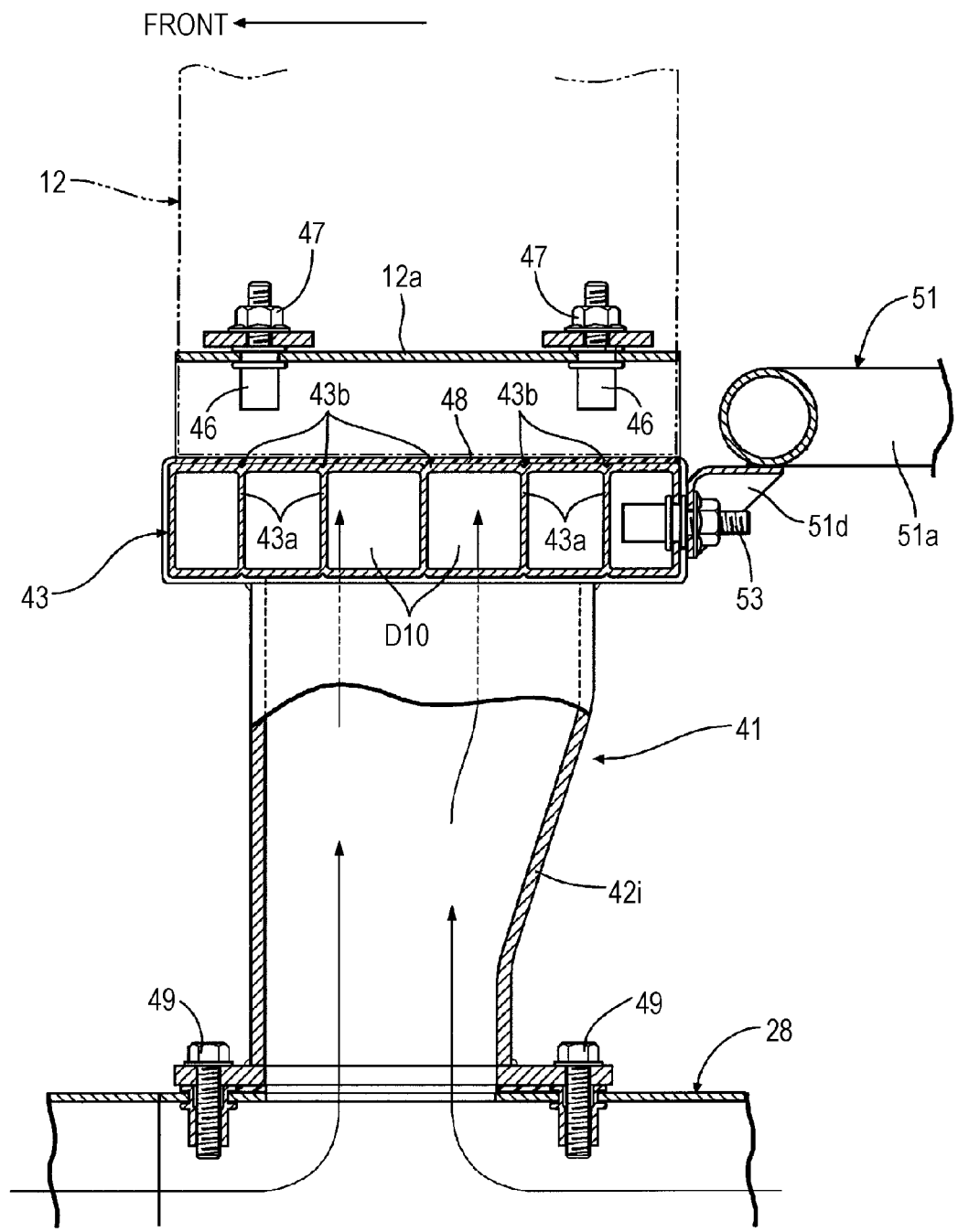
FIG. 8 is a cross-sectional view along line VIII-VIII in FIG. 2.

As shown in FIGS. 2, 7 and 8, the battery-module support 41 has the inlet-side leg 42i and the outlet-side leg 42o both formed hollow, and the flat-shaped heat exchange panel 43 bridging between the inlet-side leg 42i and the outlet-side leg 42o. The inlet-side leg 42i is fixed by bolts 49 so as to cover the opening 28a (see FIG. 3) formed in the front upper surface of the eighth vertical frame member 28. The outlet-side leg 42o is fixed by bolts 50 so as to cover the opening 29a (see FIG. 3) formed in the front upper surface of the ninth vertical frame member 29. A plurality of tenth ducts D10 are defined inside the heat exchange panel 43 by a plurality of partitions 43a extending in the air-flowing direction. Air drain grooves 43b are formed in the top surface of the heat exchange panel 43, and the two battery modules 12 constituting the sixth battery group B6 are mounted on the top surfaces of the air drain grooves 43b with the silicon sheet 48 held therebetween.

A power-supply switch support 51 formed by a bent metal pipe is provided at the back of the battery-module support 41. The power-supply switch support 51 includes a rectangular support frame 51a supporting a power-supply switch 52, and a pair of left and right support legs 51b, 51c extending downward from the left and right rear ends of the support frame 51a. A plurality of brackets 51d provided on the front edge of the support frame 51a are fixed to the rear edge of the heat exchange panel 43 by bolts 53. A mounting bracket 51e provided on the lower end of the left support leg 51b is fixed to the top surface of the ninth vertical frame member 29 by a bolt 54. A mounting bracket 51f provided on the lower end of the right support leg 51c is fixed to the top surface of the eighth vertical frame member 28 by a bolt 55. The mounting bracket 51f may be fixed to the bolt 46 holding the battery module 12 by fastening to the battery module 12.

The mounting bracket 51e at the lower end of the left support leg 51b linearly extending downward is bent at right angles toward the rear of the vehicle body. The mounting bracket 51f at the lower end of the right support leg 51c extending downward while being curved toward the front of the vehicle body is bent at right angles toward the front of the vehicle body.

Figure 9:
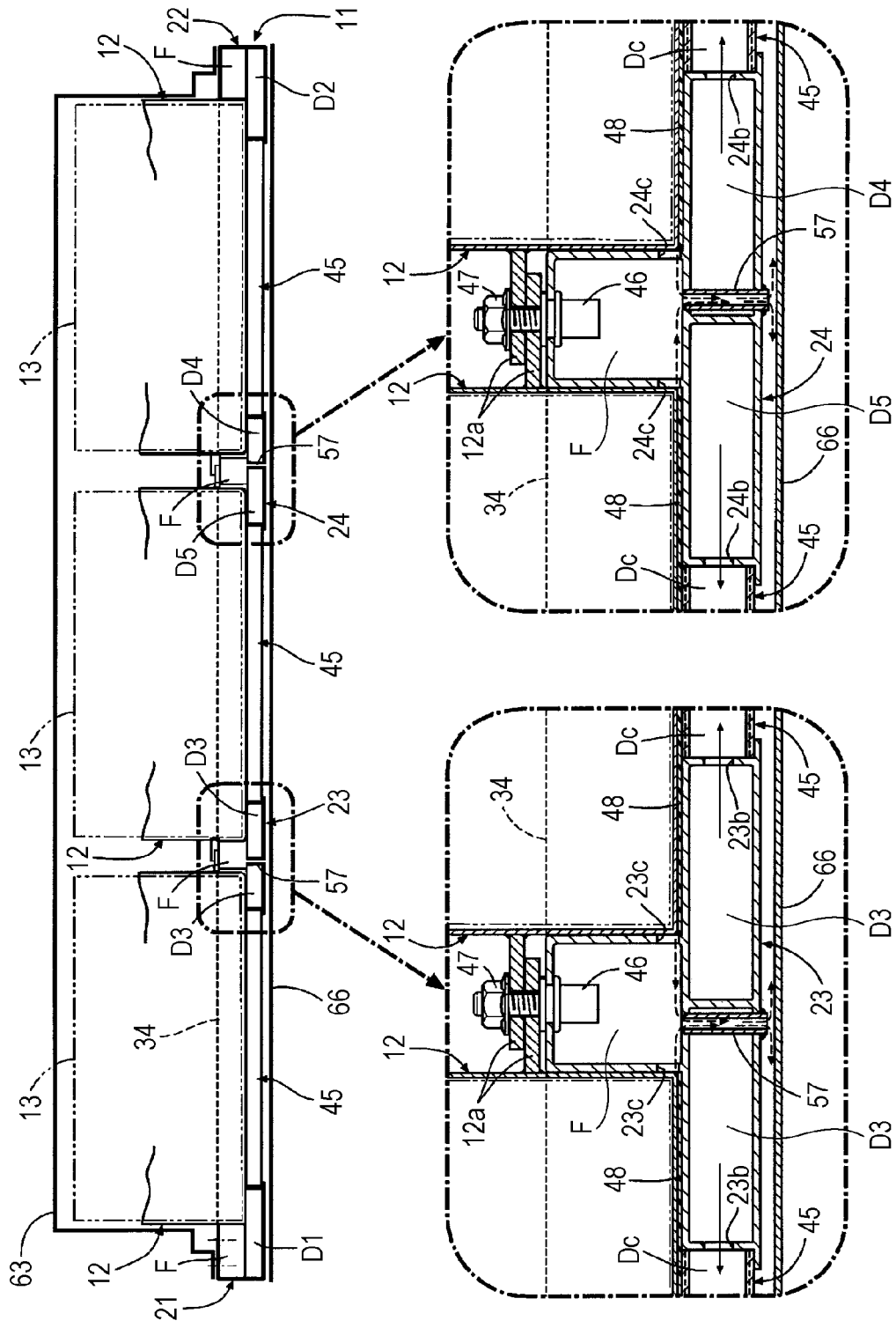
FIG. 9 is a cross-sectional view along line IX-IX in FIG. 3.

As shown in FIG. 9, a plurality of drain holes 23c and a plurality of drain holes 24c which face the top surfaces of the heat exchange panels 45, 45 are formed on both left and right side surfaces of the hollow frames F, F of the third and fourth vertical frame members 23, 24. The drain holes 23c, 24c are formed at predetermined intervals in the lengthwise direction of the third and fourth vertical frame members 23, 24 to connect the inside and outside of the hollow frames F, F of the third and fourth vertical frame members 23, 24.

A drain pipe 57 vertically penetrating the third duct D3 is provided at the rear end of the third vertical frame member 23, and a drain pipe 57 vertically penetrating the fourth duct D4 is provided at the rear end of the fourth vertical frame member 24. The upper ends of the drain pipes 57, 57 are press fitted in the upper walls of the third and fourth ducts D3, D4. The lower ends of the drain pipes 57, 57 are welded to the lower walls of the third and fourth ducts D3, D4. The drain pipes 57, 57 permit the internal spaces of the hollow frames F, F of the third and fourth vertical frame members 23, 24 to communicate with the external spaces below the third and fourth ducts D3, D4.

Figure 6:
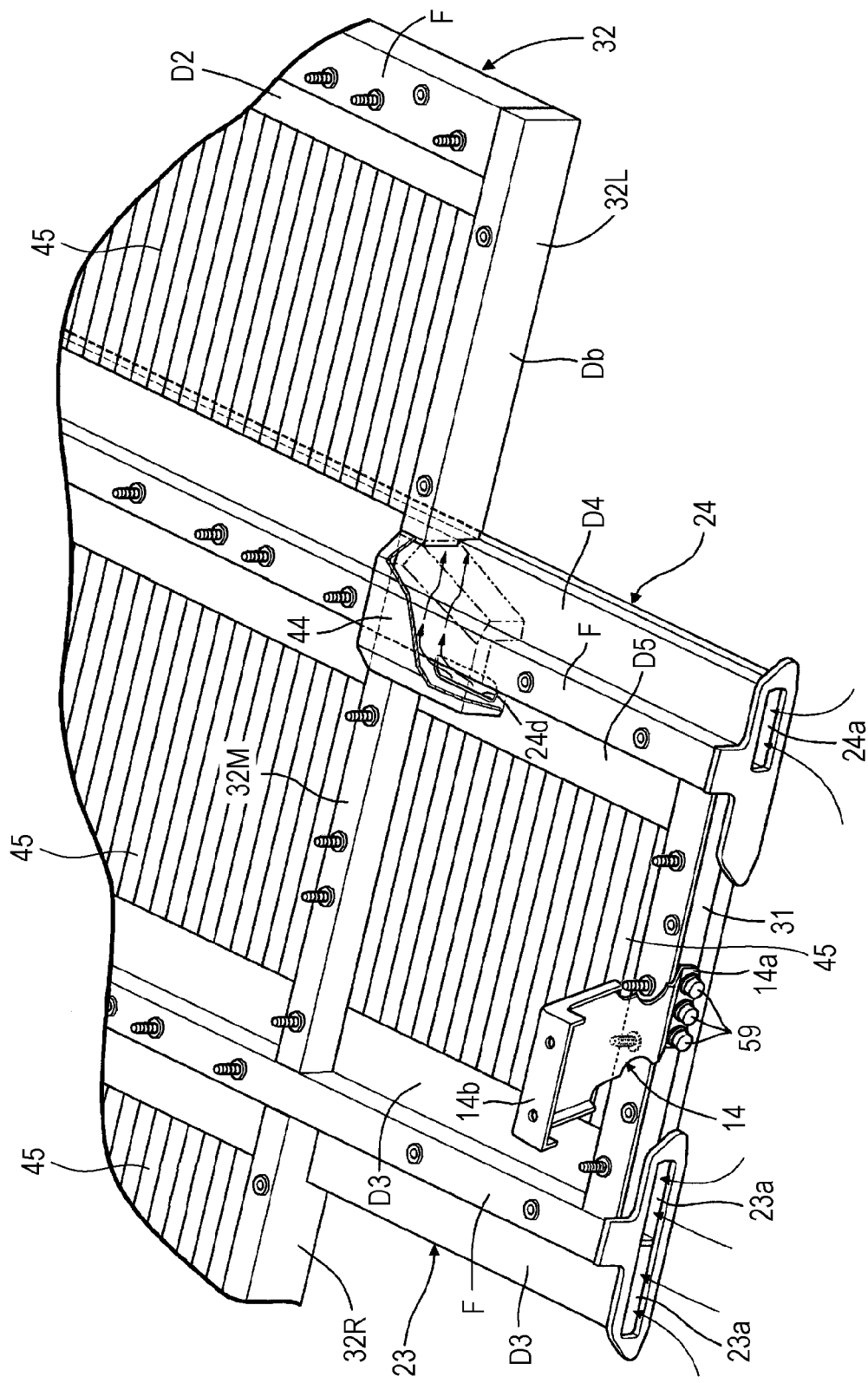
FIG. 6 is a partly enlarged view of a portion VI in FIG. 2.
Figure 10:
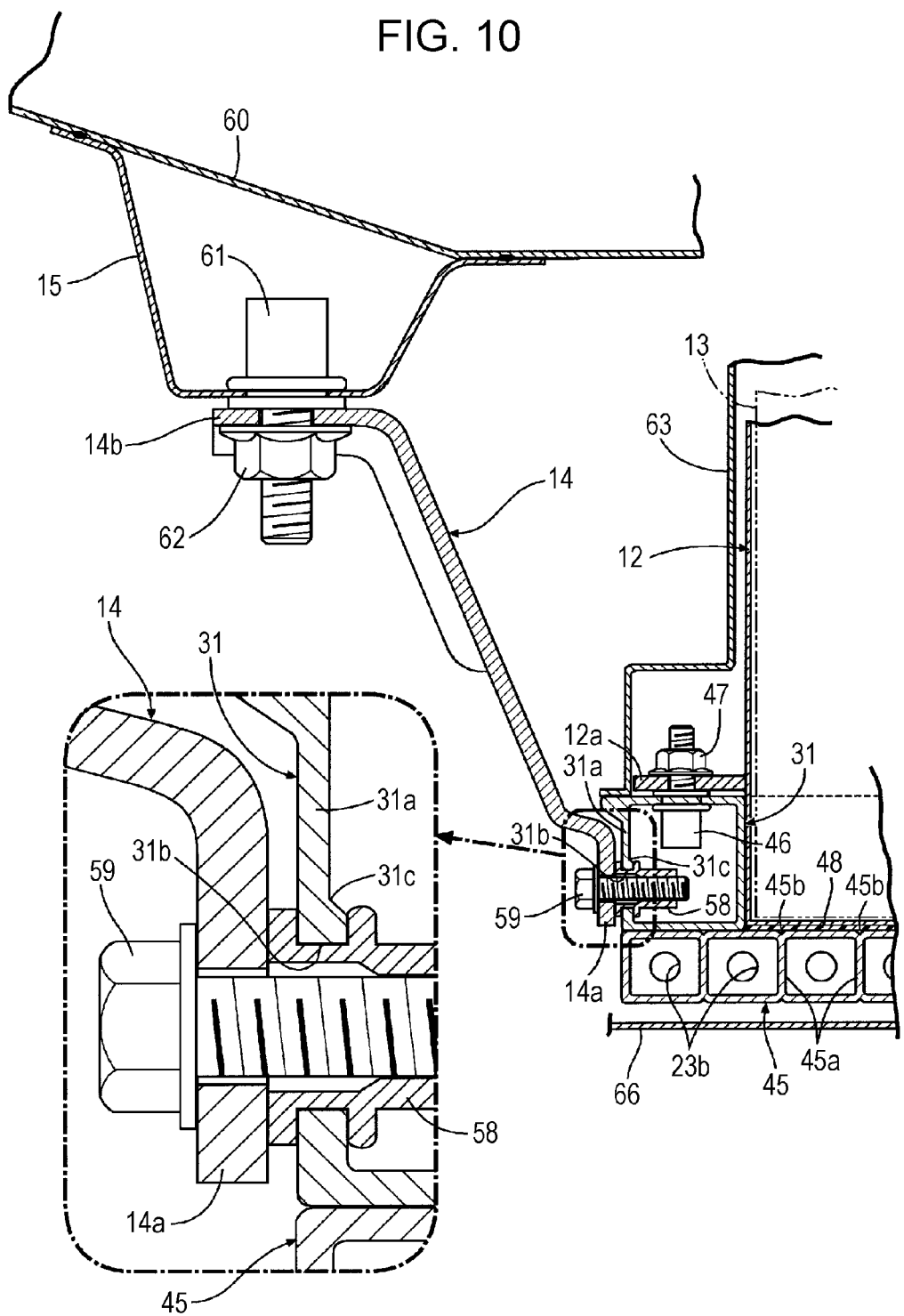
FIG. 10 is a cross-sectional view along line X-X in FIG. 3.

As shown in FIGS. 6 and 10, the first horizontal frame member 31 constituting the front edge of the tray 11 has a square cross-sectional shape, and three nuts 58 are previously fixed to three openings 31b formed in a front wall 31a. A lower flange 14a at the lower end of the mounting bracket 14 obliquely extending rear downward from the upper front abuts on the front surface of the first horizontal frame member 31, and three bolts 59 penetrating the lower flange 14a are fastened into the nuts 58. A dash-board lower panel 60 arranged at the front portion of the vehicle body extends rear downward from the upper front, and has a lower end coupled with the cross member 15 extending in the widthwise direction of the vehicle. An upper flange 14b of the mounting bracket 14 abuts on the bottom surface of the cross member 15, and is fastened by two bolts 61, 61 and two nuts 62, 62.

The front wall 31a of the first horizontal frame member 31 has a step portion 31c extending horizontally above the openings 31b, and is thicker at a lower portion of the step portion 31c and thinner at an upper portion of the step portion 31c.

As shown in FIGS. 1, 4B and 10, a battery cover 63 which covers the battery unit of an electric vehicle has a peripheral portion fixed to the periphery of the tray 11 by bolts 64 and nuts 65. The bottom surface of the tray 11 is covered with an under cover 66.

Next, the function of the embodiment of the invention with the foregoing structure will be described.

When the motor generator or the driving source of the vehicle is driven and regenerated, the battery modules 12 as the power supply generate heat. To secure the durability of the battery modules 12, it is necessary to cool the battery modules 12 with air (outside air) flowing inside the tray 11. Battery cells 13 and the battery modules 12 do not directly contact the cooling outside air, but are indirectly cooled by outside air flowing through the first to seventh ducts D1 to D7, so that the battery cells 13 and the battery modules 12 are not stained with dust or moisture contained in the outside air.

When the fan unit 19 at the downstream end of the air-flow passage is driven, as shown in FIG. 12, air is sucked through the suction ports 23a, 23a, 24a of the third and fourth vertical frame members 23, 24. The air sucked into the third duct D3 through the right suction port 23a of the third vertical frame member 23 flows in the connection ducts Dc of the lower heat exchange panels 45, 45 of the first battery group B1 from the right side surface of the third duct D3, exchanges heat while flowing in the connection ducts Dc to cool the first battery group B1, and then flows into the first duct D1 of the first vertical frame member 21 to merge at the first merge portion A.

The air sucked into the fourth duct D4 through the suction port 24a of the fourth vertical frame member 24 flows into the connection ducts Dc of the lower heat exchange panels 45, 45 of the second battery group B2 from the left side surface of the fourth duct D4, exchanges heat while flowing in the connection ducts Dc to cool the second battery group B2, and then flows into the second duct D2 of the second vertical frame member 22 to merge at the second merge portion B.

The air sucked into the third duct D3 through the left suction port 23a of the third vertical frame member 23 flows into the connection ducts Dc of the lower heat exchange panels 45 of the third battery group B3 from the left side surface of the third duct D3, exchanges heat while flowing in the connection ducts Dc to cool the second battery group B2, and then flows into the fifth duct D5 of the fourth vertical frame member 24 to be branched to front and rear directions. Part of the air in the passes through the opening 24d in the top surface of the fifth duct D5 and the inside of the flow-passage forming member 44, flows into the bypass duct Db inside the left second horizontal frame member 32L, and then flows to the front end of the second duct D2 of the second vertical frame member 22 from there to merge at the first merge portion A in the rear. The remaining part of the air in the fifth duct D5 flows rearward and flows into the sixth duct D6 of the fourth horizontal frame member 34 to be distributed to right and left directions to merge at the first merge portion A and the second merge portion B.

The air sucked into the seventh ducts D7, D7 through the suction ports 27a, 27a at the rear end of the seventh vertical frame member 27 flows into the connection duct Dc of the lower heat exchange panel 45 of the fourth battery group B4 from the right side surface of the right seventh duct D7, exchanges heat while flowing in the connection duct Dc to cool the fourth battery group B4, then flows into the eighth duct D8 of the fifth vertical frame member 25 to flow forward and merge at the first merge portion A, and flows into the connection duct Dc of the lower heat exchange panel 45 of the fifth battery group B5 from the left side surface of the left seventh duct D7, exchanges heat while flowing in the connection duct Dc to cool the fifth battery group B5, then flows into the ninth duct D9 of the sixth vertical frame member 26 to merge at the second merge portion B.

The air merged at the first merge portion A passes through the opening 28a in the top surface of the eighth vertical frame member 28, flows upward inside the inlet-side leg 42i to flow into the tenth ducts D10 in the heat exchange panel 43, exchanges heat while flowing in the tenth ducts D10 to cool the sixth battery group B6, then flows downward inside the outlet-side leg 42o and passes through opening 29a in the top surface of the ninth vertical frame member 29 to merge at the second merge portion B. Although the air flowing in the tenth ducts D10 in the heat exchange panel 43 has already exchanged heat among the first to fifth battery groups B1 to B5 so that the temperature has risen to some extent, all the air merged at the first merge portion A flows into the tenth ducts D10 so that the performance of cooling the sixth battery group B6 can be secured with a sufficient amount of air.

Since the silicon sheet 48 held between the battery modules 12 and the heat exchange panel 45 is softer than the battery modules 12 and the heat exchange panel 45, the silicon sheet 48 is deformed by the weights of the battery modules 12 to tightly contact both the battery modules 12 and the heat exchange panel 45, demonstrating the function of enhancing the efficiency of heat exchange from the battery modules 12 to the heat exchange panel 45. In addition, multiple air drain grooves 45b extending in parallel are formed in the top surface of the heat exchange panel 45, thus preventing air from being held between the heat exchange panel 45 and the silicon sheet 48 which would otherwise reduce the heat exchanging efficiency.

The functional effect of the silicon sheet 48 held between the heat exchange panel 43 on the battery-module support 41 and the battery modules 12, 12 and the functional effect of the air drain grooves 43b in the top surface of the heat exchange panel 43 on the battery-module support 41 are the same as the one described in the previous paragraph.

Although the airs flowing inside the pair of third ducts D3, D3 formed on the third vertical frame member 23 so as to contact each other are both low-temperature airs before heat exchange, low-temperature air before heat exchange flows in the fourth duct D4 in the fourth and fifth ducts D4 and D5 formed on the third vertical frame member 23 so as to contact each other while high-temperature air after heat exchange flows in the fifth duct D5. Therefore, airs with a temperature difference exchange heat with each other, which may reduce the effect of cooling the battery modules 12 of the second battery group B2.

According to the embodiment, however, the fifth duct D5 communicates with the second duct D2 via the bypass duct Db, the time for high-temperature air after heat exchange to stay in the fifth duct D5 is shorted to make heat exchange with the low-temperature air in the fourth duct D4 difficult, thereby minimizing a rise in the temperature of the air in the fourth duct D4. This can minimize reduction in the effect of cooling the second battery group B2.

All the battery modules 12 excluding the two battery modules 12 in the third battery group B3 supported at the front end of the tray 11 are arranged in such a way that cooling air flows in the lengthwise direction of the battery modules 12. In other words, the battery modules 12 are arranged so that the cooling air flows in parallel to the laminating direction of the battery cells 13 in each battery module 12.

Figure 13B:
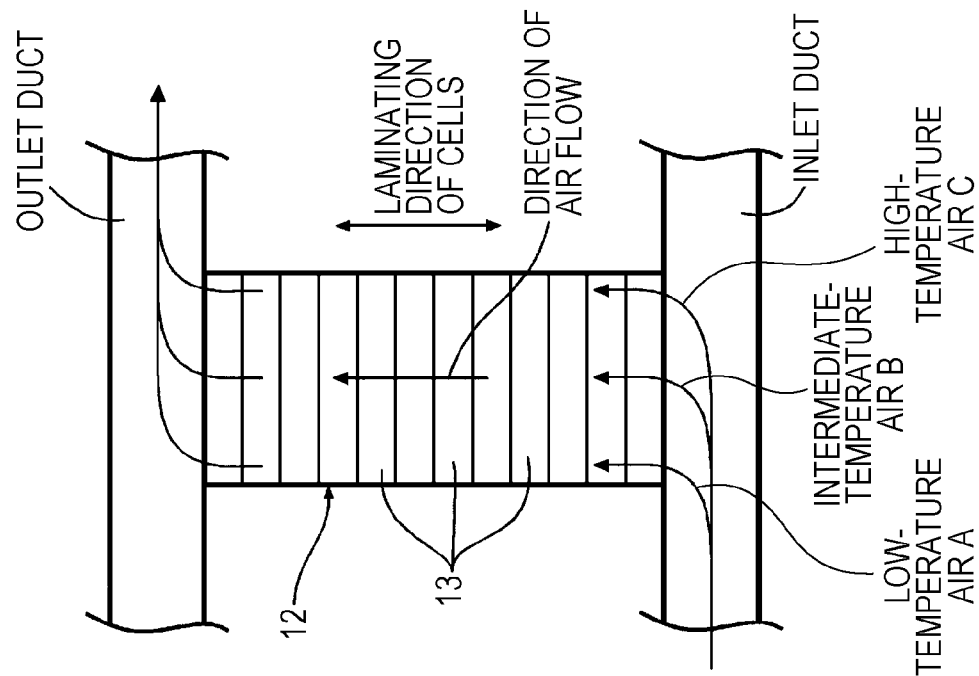
FIGS. 13A and 13B are diagrams showing the relationship between the flow passage of cooling air and the laminating direction of battery cells.
Figure 13A:
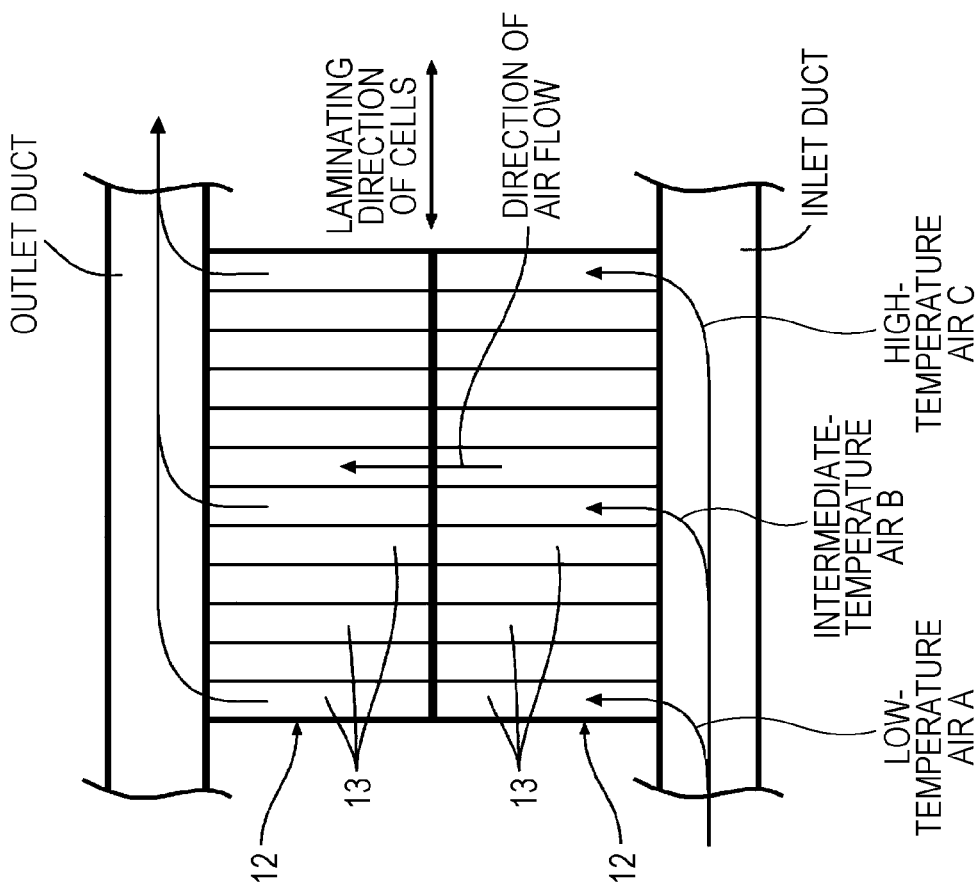

FIG. 13A shows a comparative example to the embodiment, which corresponds to a case where the laminating direction of the battery cells 13 of each battery module 12, unlike the laminating direction in the above case, is orthogonal to the air-flowing direction. In this case, the temperature of air varies according to the position in which the air flows into the heat exchange panel from the vertical frame member. Specifically, air A changing its direction on the upstream side and flowing in the heat exchange panel has a low temperature while air C changing its direction on the downstream side and flowing in the heat exchange panel has a high temperature, so that the temperature of cooling air varies at the battery cells 13 which exchange heat with the air A, at the battery cells 13 which exchange heat with the air B, and at the battery cells 13 which exchange heat with the air C. This causes a temperature variation among the battery cells 13 so that the downstream battery cells are undesirably less cooled than the upstream battery cells.

FIG. 13B shows the embodiment where the laminating direction of the battery cells 13 of each battery module 12 is parallel to the air-flowing direction. In this case, all of the low-temperature air A on the upstream side, intermediate-temperature air on the middle stream side and high-temperature air C on the downstream side contact each battery cell 13 to exchange heat. Therefore, variations in the temperatures of the airs A, B and C are made uniform among the battery cells 13, so that all the battery cells 13 are uniformly cooled to provide a uniform temperature difference, thus enhancing the durability of the battery cells 13.

Since two heavy battery modules 12 are mounted on the top surface of the heat exchange panel 43 supported by the inlet-side leg 42$i$ and the outlet-side leg 42$o$ of the battery-module support 41, moment which tends to topple the battery-module support 41 is generated by the inertial force that acts on the battery modules 12 when the vehicle starts abruptly, is braked abruptly, or turns quickly. Particularly, the inlet-side leg 42$i$ and the outlet-side leg 42$o$ are disposed apart from each other in the widthwise direction of the vehicle, and their widths in the front-to-rear direction are small, so that when the vehicle starts abruptly or is braked abruptly, the battery-module support 41 is likely to topple forward or backward.

According to the embodiment, however, the power-supply switch support 51 is connected to the rear portion of the battery-module support 41, so that stability at the time of abruptly starting the vehicle and abruptly braking the vehicle can be enhanced by increasing the toppling rigidity of the battery-module support 41 with the power-supply switch support 51. Since the mounting bracket 51$e$ of the left support leg 51$b$ of the power-supply switch support 51 extends rearward of the vehicle body, the right support leg 51$c$ of the power-supply switch support 51 is bent frontward of the vehicle body, and the mounting bracket 51$f$ of the power-supply switch support 51 extends frontward of the vehicle body, especially, the rigidity of the power-supply switch support 51 itself against toppling in the forward and rearward direction can be enhanced, eventually enhancing the toppling rigidity of the battery-module support 41 in the forward and rearward direction. In addition, the toppling rigidity of the battery-module support 41 is enhanced by using the power-supply switch support 51, eliminating the need for a special reinforcing member, which leads to reduction in the number of components and cost reduction.

Further, the heat exchange panel 43 of the battery-module support 41 which is disposed above the fourth and fifth battery groups B4, B5 at the lower layers to support the sixth battery group B6 at the top layer is formed hollow, and the top-layer sixth battery group B6 is cooled by air flowing through the tenth ducts D10 inside the heat exchange panel 43. Providing the heat exchange panel 43 with two functions of supporting the sixth battery group B6 and cooling the sixth battery group B6 can reduce the number of components and simplify the structure of the battery unit.

Furthermore, since the interior of the heat exchange panel 43 is separated into a plurality of tenth ducts D10 by a plurality of partitions 43$a$ extending in the extending in the air-flowing direction, it is possible to rectify the air flowing inside the heat exchange panel 43 with the partitions 43$a$ to reduce the flow resistance as well as prevent the heat exchange panel 43 from being crushed by the weight of the sixth battery group B6 to secure the air-flow passage. Like the heat exchange panel 43 that supports the sixth battery group B6, the heat exchange panels 45 that support the first to fifth battery groups B1 to B5 can achieve the functional effects with the help of the partition 45$a$.

When water stays on the floor face of the tray 11 due to moisture condensation or water immersion, the water may wet the battery modules 12 to reduce the durability thereof. However, water staying on the top surfaces of the heat exchange panels 45 which form the floor face of the tray 11 flows into the hollow frames F, F from the drain holes 23$c$, 24$c$ (see FIG. 9) formed in the third and fourth vertical frame members 23, 24, and are discharged to the bottom surface of the tray 11 through the drain pipes 57, 57 vertically penetrating the third and fourth ducts D3, D4. This makes it possible to prevent the battery modules 12 from being deteriorated by adhesion of moisture. Further, a labyrinth is formed by the drain pipes 57, 57, the hollow frames F, F and the drain holes 23$c$, 24$c$, so that water is inhibited from entering the tray 11 from the drain pipes 57, 57. In addition, the use of the third and fourth vertical frame members 23, 24 for drainage can prevent an increase in the number of components and complication of the structure.

Moreover, the third to fifth ducts D3 to D5 are integrally formed on the bottom surfaces of the hollow frames F, F of the third and fourth vertical frame members 23, 24, so that the hollow frames F, F can be reinforced with the third to fifth ducts D3 to D5 to further enhance the rigidity of the tray 11. In addition, the drain pipes 57, 57 vertically penetrate the third and fourth ducts D3, D4, so that the rigidity of the third and fourth ducts D3, D4 against the vertical load can be enhanced with the drain pipes 57, 57.

Further, since the drain pipes 57, 57 are positioned at the ends of the third and fourth ducts D3, D4 on the downstream side in the air-flowing direction, interference of the flow of airs in the third and fourth ducts D3, D4 with the drain pipes 57, 57 can be minimized. Even when the drain pipes 57, 57 are provided at the rear ends of the third and fourth ducts D3, D4, waters in the third and fourth ducts D3, D4 flow rearward due to inertia when the vehicle starts or is accelerated, and are discharged without any problem.

Furthermore, the lower ends of the drain pipes 57, 57 are open facing the top surface of the under cover 66 which covers the bottom surface of the tray 11, so that muddy water or the like splashed by the wheels of the vehicle while driving can be blocked with the undercover 65, thus preventing the muddy water or the like from entering the third and fourth ducts D3, D4 through the drain pipes 57, 57.

Although the foregoing description has been given of the drainage structures provided on the third and fourth vertical frame members 23, 24 to prevent the first to third battery groups B1 to B3 from being wet with water, a similar drainage structure may be provided on the seventh vertical frame member 27 to prevent the fourth and fifth battery groups B4, B5 from being wet with water.

Figure 11:
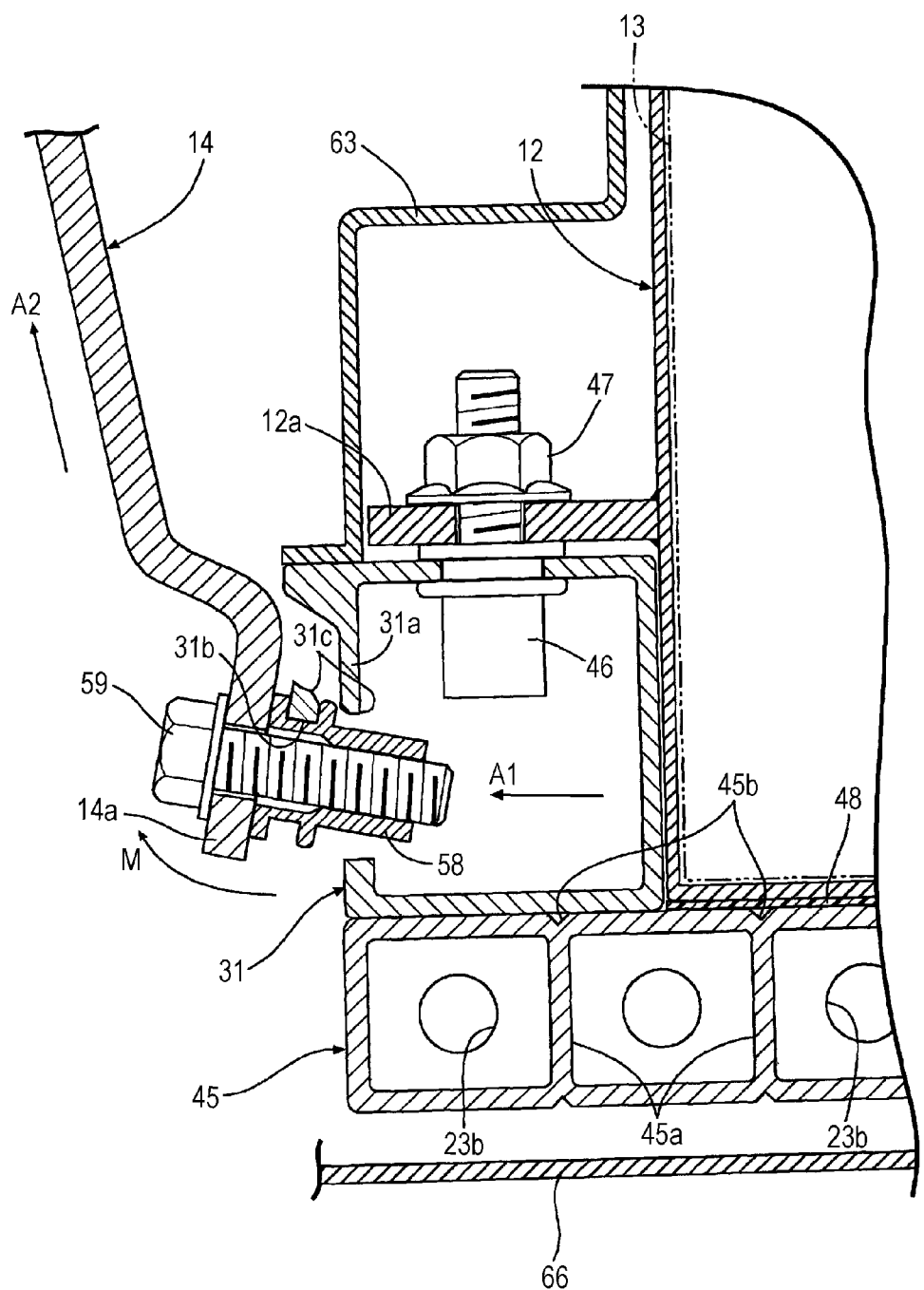
FIG. 11 is a diagram corresponding to FIG. 10 for explaining the function of the battery unit.

As shown in FIG. 11, when a vehicle crashes head-on, the very heavy battery unit moves forward due to the inertial force (see an arrow A1), and the dash-board lower panel 60, the cross member 15 and the mounting bracket 14 are deformed to be pulled upward by the crushing of the front portion of the vehicle body (see an arrow A2), so that large bending moment M acts on the mounting bracket 14 which has the upper end fixed to the cross member 15 and the lower end fixed to the first horizontal frame member 31 of the tray 11. Since the step portion 31$c$ whose strength changes abruptly is formed on the front wall 31$a$ of the first horizontal frame member 31 to which the lower flange 14$a$ of the mounting bracket 14 is coupled by the bolts 59 and the nuts 58, the bending moment M breaks the step portion 31$c$ to separate the nuts 58 from the first horizontal frame member 31, so that the front end of the tray 11 is cut away from the mounting bracket 14.

When the front end of the tray 11 is cut away from the mounting bracket 14 this way, it is possible to separate displacement of the tray 11 whose rear portion is supported on the side frames 18L, 18R with the mounting brackets 16L, 16R, 17L, 17R in a suspended state from deformation of the members of the vehicle body. As a result, it is possible to prevent stress from being applied to the battery unit or a high-voltage distributing system around the battery unit due to tension originating from the deformation of the front portion of the vehicle body, and prevent an electric-safety relating problem, such as grounding, from occurring due to the battery unit being pressed against an overlying member of the vehicle body.

Even in the normal drive mode of the vehicle, abrupt starting, abrupt braking and quick turning of the vehicle, riding over an irregular road surface or the like causes horizontal or vertical inertial force to act on the battery unit. In this case, upper rearward deformation of the dash-board lower panel 60 (see the arrow A2) does not occur, so that the bending moment M is not generated. Therefore, the step portion 31c will not break.

Although only one embodiment of the invention has been described herein, it should be apparent to those skilled in the art that the design of invention may be changed in various forms without departing from the spirit or scope of the invention.

For example, the heat exchange panels 45, 45 which form the bottom surface of the tray 11 may be arranged inclined so as to become lower gradually toward the third and fourth vertical frame members 23, 24, so that water staying on the floor face of the tray 11 can be discharged more reliably.

If a duct having a small flow passage area which is formed by the under cover 66 is provided facing the bottom surfaces of the third and fourth vertical frame members 23, 24 at the portions where the lower ends of the drain pipes 57, 57 are open, and negative pressure is generated by air flowing in the duct at high speed, it is possible to discharge water staying inside the hollow frames F, F of the third and fourth vertical frame members 23, 24 more effectively.

According to an embodiment of the invention, there is provided a vehicular battery unit including a battery unit body supporting a battery thereon, a hollow frame disposed along a floor face of the battery unit body to reinforce the battery unit body, and having a drain hole formed therein to connect the floor face of the battery unit body to an interior of the hollow frame, and a drain pipe extending downward from the interior of the hollow frame through a bottom wall of the hollow frame.

According to this embodiment, batteries are supported on the floor face of the battery unit body, the drain hole is formed in the reinforcing hollow frame disposed along the floor face of the battery unit body, and the drain pipe extends downward from the interior of the hollow frame through the bottom wall of the hollow frame, so that water remaining on the floor face of the battery unit body due to moisture condensation or water immersion is led to the interior of the hollow frame from the drain hole, and is discharged outside from the interior of the hollow frame through the drain pipe. This prevents the batteries from being deteriorated by adhesion of moisture. Further, a labyrinth is formed by the drain pipe, the hollow frame and the drain hole, inhibiting water from entering the tray from the drain pipe. In addition, the use of the reinforcing hollow frame for drainage prevents an increase in the number of components and complication of the structure.

According to an embodiment of the present invention, a duct through which a coolant to cool the battery flows may be integrally formed on a bottom surface of the hollow frame, and the drain pipe vertically penetrates the duct.

According to this embodiment, the duct through which a coolant to cool the batteries flows is integrally formed on the bottom surface of the hollow frame, so that the hollow frame is reinforced with the duct to further enhance the rigidity of the battery unit body. In addition, the drain pipe vertically penetrates the duct, so that the rigidity of the duct is enhanced with the drain pipe.

According to an embodiment of the present invention, the drain pipe may be positioned at an end portion of the duct on a downstream side of a flow direction of the coolant in addition to the first modification of the vehicular battery unit.

According to this embodiment, the drain pipe is positioned at an end portion of the duct on the downstream side of the flow direction of the coolant, thus minimizing interference of the drain pipe in the flow of the coolant in the duct.

According to an embodiment, the vehicular battery unit according to the aspect may further include an under cover covering a bottom surface of the battery unit body, wherein a lower end of the drain pipe is open facing a top surface of the under cover.

According to this embodiment, the lower end of the drain pipe is open facing the top surface of the under cover which covers the bottom surface of the battery unit body, so that muddy water or the like splashed by wheels of a vehicle while driving can be blocked with the undercover, thus preventing the muddy water or the like from entering the hollow frame through the drain pipe.

The tray 11 corresponds to a battery unit body, the first to third battery groups B1 to B3 correspond to batteries, and the third and fourth ducts D3, D4 correspond to ducts.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicular battery unit comprising:
a plurality of battery modules;
a battery unit body including a first floor face to support the plurality of battery modules;
a hollow frame disposed along the first floor face of the battery unit body to reinforce the battery unit body and having a first drain hole connecting the first floor face of the battery unit body to an interior of the hollow frame; and
a drain pipe extending downward from the interior of the hollow frame through a bottom wall of the hollow frame,
wherein the hollow frame is provided between a first battery module and a second battery module of the plurality of battery modules,
wherein the hollow frame includes a first side surface contacting the first battery module and a second side surface contacting the second battery module,
wherein the first drain hole is provided on the first side surface of the hollow frame, and
wherein the first drain hole is provided on the hollow frame at a location between the first battery module and the second battery module.

2. The vehicular battery unit according to claim 1, further comprising:
a duct through which a coolant to cool the battery flows, the duct being integrally formed on a bottom surface of the hollow frame, wherein
the drain pipe vertically penetrates the duct.

3. The vehicular battery unit according to claim 2, wherein the drain pipe is positioned at an end portion of the duct, the end portion being disposed on a downstream side of a flow direction of the coolant in the duct.

4. The vehicular battery unit according to claim 1, further comprising:
an under cover covering a bottom surface of the battery unit body, wherein
a lower end of the drain pipe is open toward a top surface of the under cover.

5. The vehicular battery unit according to claim 2, further comprising:
an under cover disposed under a bottom surface of the duct, a space being provided between the under cover and the bottom surface of the duct, wherein
a lower end of the drain pipe is open toward a top surface of the under cover.

6. The vehicular battery unit according to claim 1, wherein the battery unit body further includes a second floor face to support a second battery, and
the hollow frame is disposed between the first and second floor faces and has a second drain hole connecting the second floor face of the battery unit body to the interior of the hollow frame.

7. The vehicular battery unit according to claim 1, wherein the hollow frame has a second drain hole connecting the first floor face of the battery unit body to the interior of the hollow frame, and
the second drain hole is provided on the second side surface of the hollow frame.

8. The vehicular battery unit according to claim 7, wherein the drain pipe is configured to receive both fluid entering through the first drain hole and fluid entering through the second drain hole.

9. The vehicular battery unit according to claim 1, wherein
a second drain hole is provided on the second side surface of the hollow frame,
the hollow frame is disposed between the first battery module and the second battery module in a first direction, and
the first side surface is disposed on an opposite side of the second side surface in the first direction.

10. A vehicular battery unit comprising:
a plurality of battery modules;
a battery unit body including a first floor face to support the plurality of battery modules;
a frame disposed along the first floor face of the battery unit body to reinforce the battery unit body and having a first drain hole connecting the first floor face of the battery unit body to an interior of the frame; and
a drain pipe extending downward from the interior of the frame through a bottom wall of the frame,
wherein the frame is provided between a first battery module and a second battery module of the plurality of battery modules,
wherein the frame includes a first vertically-extending side surface contacting the first battery module and a second vertically-extending side surface contacting the second battery module,
wherein the first drain hole is provided on the first vertically-extending side surface of the frame,
wherein the frame has a second drain hole connecting the first floor face of the battery unit body to the interior of the frame, and
wherein the second drain hole is provided on the second vertically-extending side surface of the frame.

11. The vehicular battery unit according to claim 10, wherein the drain pipe is configured to receive both fluid entering through the first drain hole and fluid entering through the second drain hole.

12. A vehicular battery unit comprising:
a plurality of battery modules;
a battery unit body including a first floor face to support the plurality of battery modules;
a frame disposed along the first floor face of the battery unit body to reinforce the battery unit body and having a first drain hole connecting the first floor face of the battery unit body to an interior of the frame; and
a drain pipe extending downward from the interior of the frame through a bottom wall of the frame,
wherein the frame is provided between a first battery module and a second battery module of the plurality of battery modules,
wherein the frame includes a first vertically-extending side surface contacting the first battery module and a second vertically-extending side surface contacting the second battery module, and
wherein the first drain hole is provided on the first vertically-extending side surface of the frame,
wherein a second drain hole is provided on the second vertically-extending side surface of the frame,
wherein the frame is disposed between the first battery module and the second battery module in a first direction, and
wherein the first vertically-extending side surface is disposed on an opposite side of the second vertically-extending side surface in the first direction.

* * * * *